July 4, 1950 M. H. SWITZER ET AL 2,513,898
APPARATUS FOR HEATING AND COOLING FOODS
Filed July 9, 1949 2 Sheets-Sheet 1

INVENTORS
Marshall H. Switzer &
BY Charles Olin Ball
Owen & Owen
ATTORNEYS

July 4, 1950　　　M. H. SWITZER ET AL　　　2,513,898
APPARATUS FOR HEATING AND COOLING FOODS
Filed July 9, 1949　　　　　　　　　　　　2 Sheets-Sheet 2

INVENTOR.
Marshall H. Switzer &
BY Charles Olin Ball

Owen & Owen
ATTORNEYS

Patented July 4, 1950

2,513,898

UNITED STATES PATENT OFFICE 2,513,898

APPARATUS FOR HEATING AND COOLING FOODS

Marshall H. Switzer, Oak Park, Ill., and Charles Olin Ball, Maumee, Ohio

Application July 9, 1949, Serial No. 103,822

6 Claims. (Cl. 99—252)

1

This invention relates to apparatus for rapidly heating or cooling foods and, particularly, for sterilizing liquid or semi-liquid foods.

In canning, sterilizing or pasteurizing dairy products, purée foods, cream-style corn and other liquid or semi-liquid foods, rapid heating and cooling of the food is desirable from a standpoint of economy as well as for improved flavor of the treated food. In the past, liquid and semi-liquid foods have been passed through tubes and channels in order to effect rapid heating of the foodstuffs. While these devices have operated satisfactorily for a short time, pyrolysis of the food upon the sides of the tubes and channels insulates the food from the heating source and builds up ultimately to the point where it is impractical to continue the sterilization or other process. This layer of pyrolized food about the circumference of the tubes not only requires an increased amount of heat to be used, but eventually builds up to the point where the cross sectional area of the food channel is greatly reduced and the pressure necessary to maintain a definite rate of flow of food through the tubes is considerably increased. Another disadvantage of these prior art devices is that dislodged particles of the pyrolized food impart an undesirable taste to the remaining food passing through the channel or tube. Furthermore, cleaning of such tubes and channels to remove the pyrolized material, even after use, is difficult and in some cases practically impossible. Coating of the tubes occurs not only due to the pyrolysis of the food, but also may occur at points along the tube where cooling means are applied due to sudden gelling.

It is an object of this invention to provide an apparatus for heating and/or cooling liquid or semi-liquid foods, which is so constructed that pyrolized food is continuously removed from the heated surfaces which contact the food, and whose operation is unaffected by thermal expansion or contraction of its parts.

Another object of this invention is to provide an apparatus for heating and/or cooling foodstuffs wherein the food is passed through a spiral groove or channel so constructed as to be readily accessible for cleaning purposes.

Still another object of this invention is to provide apparatus capable of rapidly sterilizing food wherein any pyrolized material is continuously removed from the heating surfaces which the food contacts so as to maintain the heat exchange properties substantially constant throughout the sterilizing procedure and to leave the flavor of the treated food unimpaired.

2

Other objects and advantages of this invention will become apparent to those skilled in the art from the following detailed description thereof, when read in conjunction with the accompanying drawings, in which—

Figure 1:
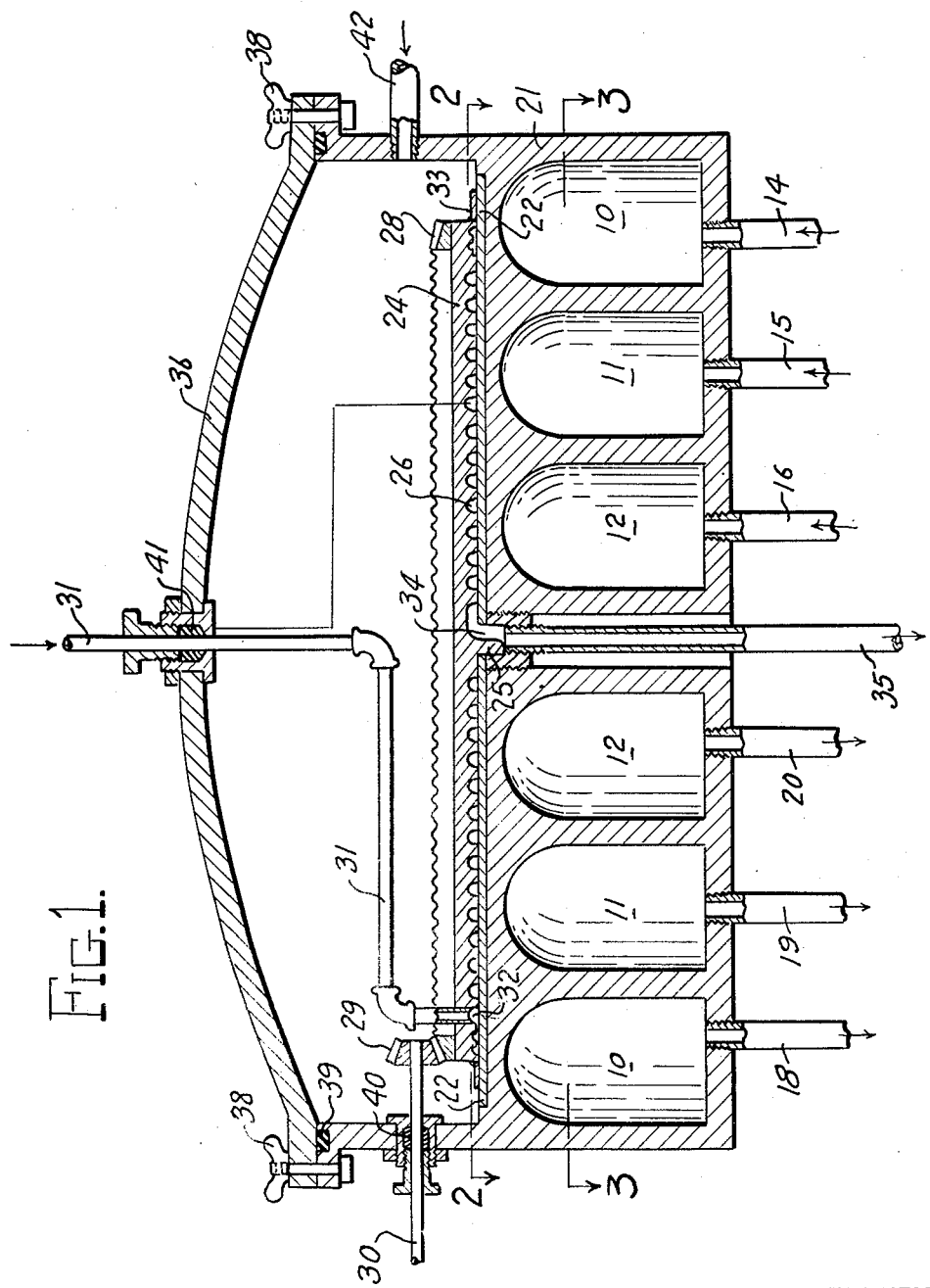
Figure 1 is a cross-sectional view of one particular embodiment of the present invention.
Figure 2:
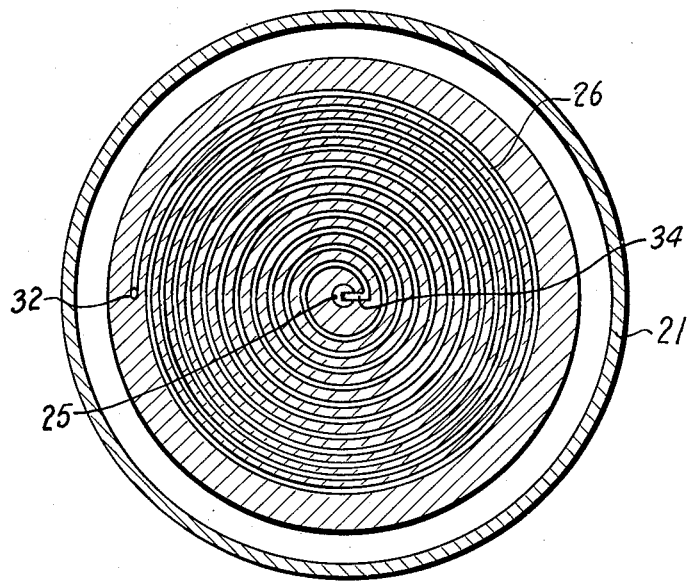
Figure 2 is a sectional view taken on line 2—2 of Figure 1.
Figure 3:
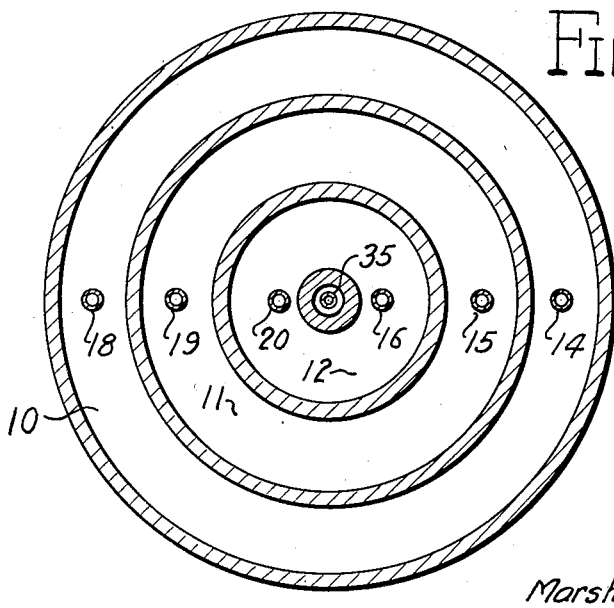
Figure 3 is a sectional view taken on line 3—3 of Figure 1.

In the particular embodiment of the invention shown in the accompanying drawings, a plurality of heating chambers 10, 11 and 12 is provided having inlets 14, 15 and 16, respectively, for some heating medium such as steam. Upon the opposite side of these heating chambers are provided outlets 18, 19 and 20 for chambers 10, 11 and 12, respectively. All of the heating chambers 10, 11 and 12 are located within a container 21. Over the top of the heating chambers is positioned a flat bearing plate 22 of stainless steel or some other suitable metal capable of resisting corrosion by foodstuffs. Although not specifically stated in each instance, it will be assumed that all metal surfaces coming into contact with the food are made of the usual stainless steel alloys or other corrosion resistant metals. A disc 24 rests upon the bearing plate 22 and is located centrally thereof by means of a stub shaft 25. In the bottom of the disc 24 is formed a spiral groove 26, best shown in Figure 2. About the circumference of the disc 24 is located a beveled ring gear 28 which is driven by beveled gear 29 connected through a shaft 30 to a suitable power source (not shown). Rotation of the beveled gear 29 which meshes with the ring gear 28, in turn causes rotation of the disc 24 about the stub shaft 25. Food is delivered through a supply pipe 31 which is connected to the outer end of the spiral, as shown at 32. Continuing through the spiral 32 in the disc 24, the food progresses inwardly until it reaches a discharge slot 34 formed in the stub shaft 25. After the food passes through the discharge slot 34 it passes out of the container 21 through a pipe 35.

In order to maintain a sealed contact between the disc 24 and the bearing plate 22, a lid 36 attached to the container 21 by means of wing nuts 38—38 provides an air-tight enclosure about the disc 24. To assist in sealing this enclosure, a ring 39 of a suitable resilient material is provided between the lid 36 and the container 21. It will also be noted that the rotatable shaft 30 and the rotatable supply pipe 31 penetrate the container wall 21 and the lid 36, respectively, through conventional packings 40 and 41. Some suitable gas is introduced into the container 21 above the disc 24 through the inlet pipe 42. In the event that this gas is steam or some other condensable vapor, a steam trap (not shown) would be provided.

In the operation of this particular embodiment of the present invention food is passed through the supply pipe 31 and into the spiral groove 26 at the point 32. Simultaneously, the disc 24 is rotated and held in fluid tight engagement against the plate 22 by means of gas pressure from gas introduced through the inlet 42. A metal sealing ring 33, preferably composed of softer metal than bearing plate 22, provides a barrier to prevent the gas introduced through the inlet 42 from leaking into the channel 36 which carries the food. The food moves from the outside to the inside of the disc 24 through the groove 26, so any bacteria carrying gas that does leak past the ring 33 into the food is sterilized before the food is discharged from the apparatus. The disc 24 rotates upon the plate 22, preferably in a direction opposite to the movement of the food through the groove 26, and any pyrolized foodstuffs which have formed upon the surface of the plate 22 (the only positively heated surface which the food contacts), is continuously removed by a scraping action of the disc 24 upon the plate 22. Expansion and contraction of the plate 22, as well as the disc 24, in no way affects the operability of this device. The sterilized, cooked or otherwise treated foodstuffs then pass out through the discharge slot 34 and the pipe 35.

Although not specifically shown in the apparatus disclosed in the accompanying drawings, it will be evident to those skilled in the art that the temperature of the food is carefully controlled at all times. Thermostatic control elements may be positioned in the food supply pipe 31, the channel 26, the discharge slot 34, the pipe 35 or at whatever points are deemed desirable. The particular embodiment shown is advantageous in that the temperature of the bearing plate 22, through which heat from chambers 10, 11 and 12 is transmitted to the food in the groove 26, may be varied from the outside of the plate toward the inside. In the treatment of certain foods, it is desirable to increase successively the temperature in chambers 10, 11 and 12. The reason for this is that too high an initial temperature may cause excessive pyrolysis of the food, yet it is desirable to maintain a steep thermal gradient between the food and the heating medium in order to create a high rate of heat exchange. Thus, as the temperature of the food is increased, the temperature of the heating medium is likewise increased. In certain cases, however, the food may be given an initial surge of heat before it has reached a temperature at which pyrolysis occurs, and the temperature of the heating medium in chambers 11 and 12 reduced to prevent pyrolysis. The ability to vary the temperature of various portions of bearing plate 22 is thus seen to be highly advantageous.

It will be apparent to one skilled in the art that a number of variations and modifications may be made in the disclosed apparatus without departing from the scope of the present invention. For example, means other than gas pressure (for example, spring operated members) may be employed to hold the disc 24 in sealed contact with the plate 22. Although the plate 22 may be omitted, it is advantageous structurally because rotation of the disc 24 wears the plate 22 upon which it rests, and easy replacement is, therefore, desirable. Furthermore, the food may enter the apparatus at the inner end of the groove and travel through the groove toward the periphery of the disc, instead of in the reverse, as above described.

Devices embodying the present invention are advantageous in that they provide means for rapidly heating or rapidly cooling foodstuffs, along with additional means for continuously removing pyrolized material which may be formed upon the heating surfaces that contact the food. Moreover, expansion and contraction of the parts due to changes in temperature in no way affect the operation of the apparatus. In addition, the grooves carrying the food are readily accessible for cleaning purposes when and if this should become desirable.

Although the apparatus comprising the present invention has been described in connection with the heating and cooling of food, it will be obvious that the scope of the invention is not restricted to any particular use. For example, this apparatus may be used for cooking drying oils for paints and the like.

What we claim is:

1. Apparatus for treating liquid and semi-liquid foods which comprises temperature changing means, a bearing plate having a flat surface in contact with the temperature changing means, a rotatably mounted disc having a spiral groove formed in a flat surface thereof, means for holding the grooved surface of the disc in liquid tight engagement with the bearing plate, means for introducing food into the spiral groove in the disc, discharge means connected to said spiral groove, and means for rotating the disc upon the surface of said bearing plate while food is passing through the groove.

2. Apparatus for treating food which comprises a bearing member having a flat surface and which acts as a heat exchanger, heat changing means in contact with the bearing member, a rotatably positioned disc having a spiral groove in a flat surface thereof, means for holding the grooved surface in liquid tight engagement with the bearing member, means for rotating the disc, and means for passing food through the spiral groove in the disc.

3. Apparatus for heating liquid and semi-liquid foods, which comprises a heat exchange plate, means to vary the temperature of said plate from the outside to the center of the plate, a rotatably mounted disc having a flat surface and having a spiral groove formed in this flat surface, means for holding said flat surface of the disc in liquid-tight engagement with the heat exchange plate, means for rotating the disc, a conduit connected to the outer end of the spiral groove for feeding food thereto, and a discharge conduit connected to the inner end of the spiral to remove food therefrom.

4. Apparatus for heating liquid and semi-liquid foods, which comprises a flat bearing plate, a plurality of heating chambers in contact with one side of said plate, a rotatably mounted disc having a flat surface with a spiral groove formed therein, gas pressure means for maintaining the flat, grooved surface of the disc in liquid-tight engagement with the bearing plate, a ring gear integral with said disc, power means adapted to engage the ring gear to rotate the disc, and means for passing through the groove in the disc during rotation thereof.

5. Apparatus for heating liquid and semi-liquid foods, which comprises a flat bearing plate, a plurality of heating chambers in contact with one side of said plate, a rotatably mounted disc having a flat surface with a spiral groove formed therein, gas pressure means for maintaining the flat, grooved surface of the disc in liquid-tight engagement with the bearing plate, a ring gear integral with said disc, power means adapted to engage the ring gear to rotate the disc, and separate means to supply heat to each of said chambers whereby different temperatures may be established in different zones in the plate.

6. Apparatus for treating food which comprises a bearing member having a flat surface and which acts as a heat exchanger, heat changing means in contact with the bearing member, a rotatably positioned disc having a spiral groove in a flat surface thereof, steam pressure means for holding the grooved surface in liquid-tight engagement with the bearing member, means for rotating the disc, and means for passing food through the spiral groove in the disc.

MARSHALL H. SWITZER.
CHARLES OLIN BALL.

No references cited.